Figure 1:
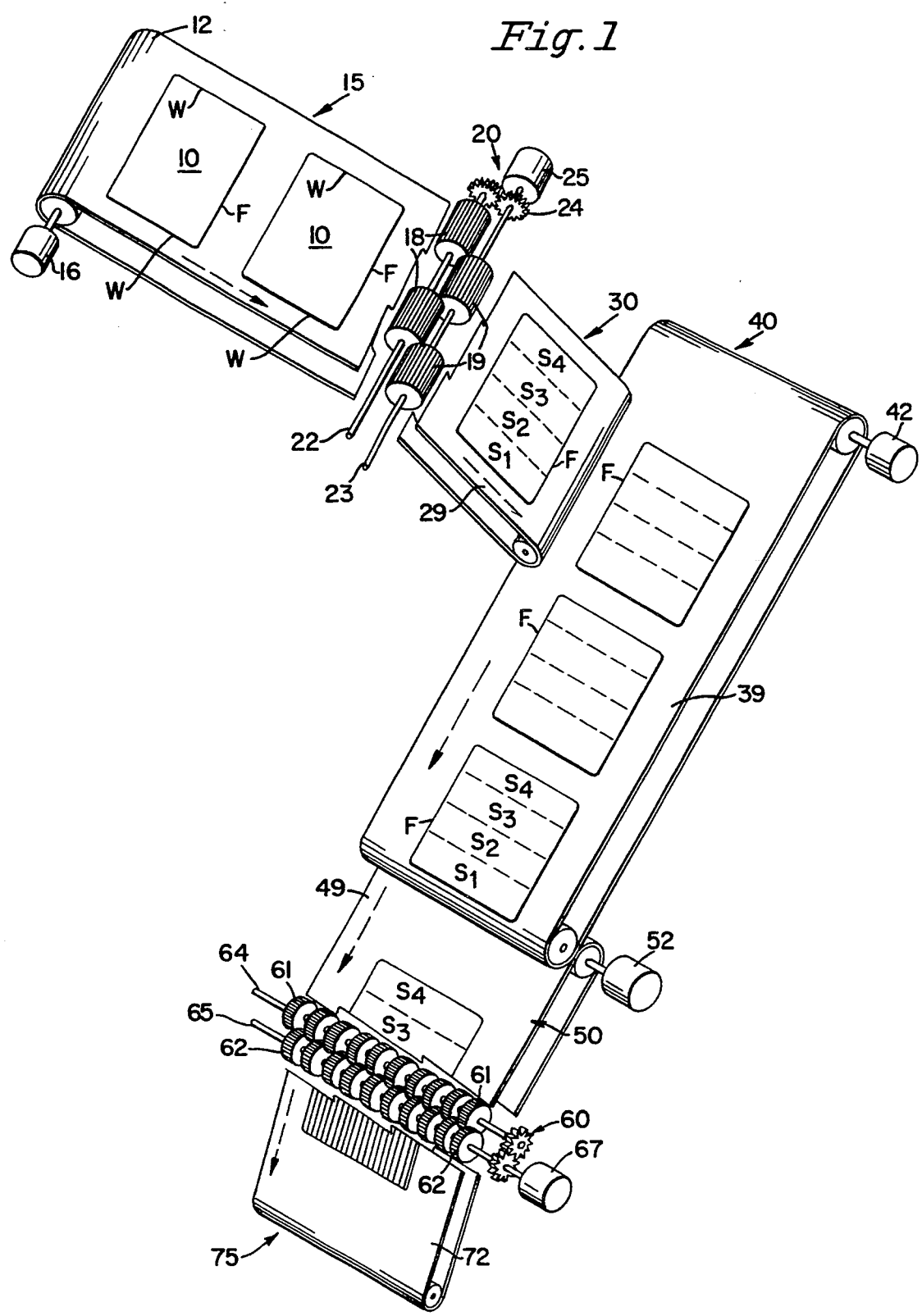

United States Patent [19]

Ward

[11] Patent Number: 5,358,187
[45] Date of Patent: Oct. 25, 1994

[54] METHODS OF AN APPARATUS FOR PRODUCING IMPROVED BEDDING MATERIALS FROM SCRAP NEWSPAPER

[76] Inventor: Paula M. L. Ward, P.O. Box 43, Sergeantsville, N.J. 08557

[21] Appl. No.: 942,436

[22] Filed: Sep. 9, 1992

[51] Int. Cl.⁵ .................................................. B02C 18/00
[52] U.S. Cl. ......................................... 241/3; 241/29; 241/101.4; 241/159; 83/404.1; 83/408; 83/498
[58] Field of Search ............. 241/3, 101.4, 29, 223, 241/236, 159; 83/48, 404.1, 498, 408

[56] References Cited

U.S. PATENT DOCUMENTS

| | | | |
|---|---|---|---|
| 3,024,829 | 3/1962 | Griffin | 241/223 X |
| 3,031,745 | 5/1962 | Dzialo | 241/29 X |
| 3,650,168 | 3/1972 | Ruschmann | 83/408 X |
| 3,909,342 | 9/1975 | Shook | 83/408 X |
| 3,915,039 | 10/1975 | Schoppee | 83/408 X |
| 3,990,336 | 11/1976 | Soodalter | 83/408 X |
| 4,123,489 | 10/1978 | Kelley | 241/221 X |
| 4,157,696 | 6/1979 | Carlberg | 119/1 |
| 4,194,698 | 3/1980 | Kosmowski | 241/236 |
| 4,201,128 | 5/1980 | Whitehead et al. | 100/45 |
| 4,347,985 | 9/1982 | Simpson | 241/3 X |
| 4,376,422 | 3/1983 | Whitehead et al. | 119/1 |
| 4,522,096 | 6/1985 | Niven, Jr. | 241/223 X |
| 4,570,573 | 2/1986 | Lohman | 119/1 |
| 4,925,116 | 5/1990 | Lundell | 241/236 |
| 5,071,075 | 12/1991 | Urens | 241/25 |
| 5,099,734 | 3/1992 | Sugiyama et al. | 83/498 |
| 5,100,600 | 3/1992 | Keller et al. | 119/171 X |
| 5,135,178 | 8/1992 | Strohmeyer | 241/236 X |
| 5,146,820 | 9/1992 | Nemeth et al. | 241/236 X |

FOREIGN PATENT DOCUMENTS

| | | | |
|---|---|---|---|
| 1374001 | 11/1974 | United Kingdom | 83/498 |
| 2261586 | 5/1993 | United Kingdom . | |

*Primary Examiner*—Timothy V. Eley
*Assistant Examiner*—Frances Han

[57] ABSTRACT

The present invention relates to the production of shredded paper products such as bedding materials composed of paper bits. Scrap newspapers in tabloid format, or standard straight broadsheet format are cut into a multiplicity of bits, the dimensions predictably and consistently controlled to insure the paper bit production of substantially uniform and optimally acceptable sizes (length and width) most suitable for the type of end product use intended. This permits the selective production of shredded paper products customized to meet a particular end use, for example bedding material particularly suited for large animal bedding or bedding materials more suitable for small animals such as poultry and/or agricultural mulches.

10 Claims, 2 Drawing Sheets

METHODS OF AND APPARATUS FOR PRODUCING IMPROVED BEDDING MATERIALS FROM SCRAP NEWSPAPER

This invention relates to methods of and apparatus for making shredded paper products from scrap newspapers, and more particularly to new and improved methods of and apparatus for recycling scrap newspapers to produce improved bedding materials.

Individuals engaged in animal husbandry require a reliable and economical supply of animal bedding materials for organic waste management and disposal purposes. Conventional bedding materials for such purposes include shredded paper, straw, wood shavings, sawdust and sand. The selection of a material for use as animal bedding is ordinarily based upon its liquid absorbancy properties (or as in the cases of sand and straw its drainage properties), its availability at an economical cost, its ability to minimize insect attraction and organic odors, its manageability from installation to disposal, and its compostability for optimizing the economics and effectiveness of ecologically sound waste disposal measures.

Paper, for example scrap newspaper, is the most absorbant of the materials commonly used for the purpose of containing and handling organic waste in animal habitats. In recent times, scrap newspaper has been promoted by waste management authorities, soil conservation groups and economists to be the most environmentally friendly and economically beneficial bedding material available to most animal management operations.

The ecological and economic advantages of increasing the usages of scrap newspaper for animal and general agricultural bedding material are manifest. In particular it would be desirable to increase the usage of scrap newspaper for bedding large animals. However, to achieve this objective the scrap newspaper must be processed into a condition comparable to other types of bedding materials to permit the employment of conventional management practices, i.e. the use of existing forking equipment, containment tools, conveyances and other management systems, while lowering material costs.

Bedding material has been fabricated from scrap newspaper in many different ways. Conventional methods include manual tearing, pulverizing by grinding, chopping by moving blades and shredding by use of shredding equipment such as document shredders. The final condition of the product varies widely from process to process. Sonic processes, such as grinding and chopping tend to produce undesirable amounts of chaff including tiny or dust-like particles, resulting in products which in usage can present respiratory problems for both animals and humans. Shredding has the potential to reduce the aforementioned health hazard and heretofore has been considered a preferred method for producing bedding material from scrap newspaper.

Unfortunately when conventional shredded paper products are employed as bedding, particularly for large animals (e.g. cattle and horses) problems arise not unlike those created by some of the other commonly used bedding materials. These problems can be attributed to the relatively long and narrow paper strips produced by shredding processes which when employing conventional document shredders or the like, inherently generate strips of this form. These long and slender strips of paper have a great propensity for becoming wrapped about an animal's legs and subsequently dragged out of confines of the stall areas. Such strips also have an increased likelihood of becoming entangled in the moving parts of machinery used to handle the bedding material or becoming blown about the farm to festoon fences and trees.

It is an object of the present invention to overcome these substantial shortcomings of prior methods for producing shredded paper products, more particularly bedding materials made from scrap newspapers for animal husbandry and agricultural uses.

A method illustrating certain features of this invention includes the use of a minimum of two stages of strip cutting. In one stage a standard scrap newspaper is cut into a plurality of substantially parallel sections, a predictable percentage which are of acceptable ultimate strip lengths (USL). In another stage these sections are subsequently shredded by cutting the sections perpendicularly into discrete bits, a predictable percentage of which are of acceptable ultimate strip widths (USW).

Apparatus illustrating certain features of the invention may include means for advancing a scrap newspaper in a direction perpendicular to a commonly oriented edge of each of the multiplicity of conventionally folded sheets thereof. Means are provided for simultaneously severing the sheets of the advancing newspaper into a plurality of parallel paper strips by spaced cuts substantially perpendicular to the commonly oriented edge. Means are also provided for receiving the parallel strips and for maintaining them in a mutually parallel, essentially coplaner array. This parallel array of strips is then advanced by conveying means in a direction also parallel to the commonly oriented edge, through means for severing each of the parallel strips of the array by a multiplicity of spaced cuts parallel to the commonly oriented edge, producing a plurality of bits.

In accordance with the teachings and principles of the invention, conventional shredding machines can be modified to mechanize the process to achieve highly efficient and economical production of improved bedding materials from paper, particularly scrap newspaper.

Figure 2A:
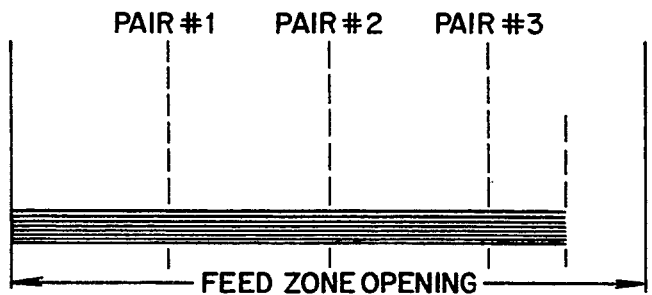
Figure 2B:
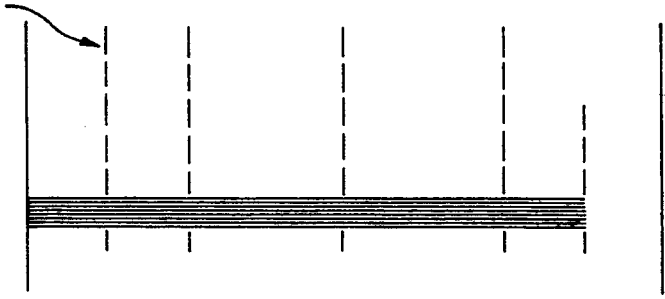
Figure 3:
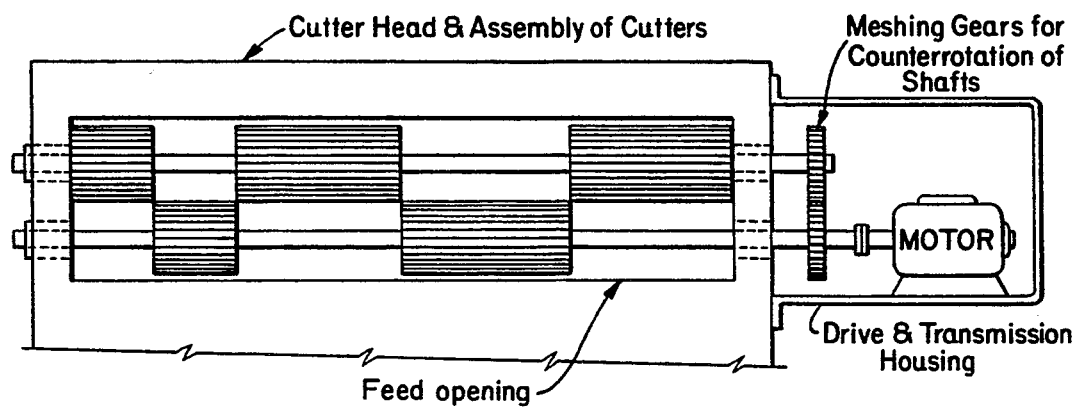

A complete understanding of the invention may be had from the following detailed description of specific embodiments thereof, when read in conjunction with the appended drawings in which:

FIG. 1 is a schematic view, in perspective, of a mechanical arrangement lot practicing exemplary embodiments of the invention;

FIG. 2A illustrates diagrammatically three shear pairs equidistantly spaced across a sixteen inch wide, first cutting stage feed zone, and the two extreme positions that can be occupied by advancing tabloid format newspapers, and FIG. 2B illustrates diagrammatically three shear pairs equidistantly spaced across a sixteen inch wide, first stage cutting feed zone, another shear pair spaced two inches from either the extreme right or left end of the sixteen inch feed zone, and the extreme position that can be occupied by consistent placement of advancing broadsheet newspapers or a combination of broadsheet and tabloid format and FIG. 3 illustrates the position of the cutting members in the first severing stage.

Referring now to FIG. 1, there is shown schematically an example of an arrangement of apparatus for producing bedding material from scrap newspapers.

Preferably the scrap newspapers used for animal bedding are of standard grades, ranging from Grade #6 to Grade #9, as defined by *Scrap Specifications Circular 1990,Guidelines for Paper stock: PS-90Export Transactions* Paper Stock Institute, A Division of Institute of Scrap Recycling Industries, Inc. For example Grade #9 scrap paper is defined as "Over-issue News" and consists of unused, overrun regular newspapers printed on newsprint containing not more than the normal percentage of rotogravure and colored sections. Other materials are not permitted to be present in the paper stock and the paper must not have been manufactured or treated or in such form as to be unsuitable for consumption as the grade specified (e.g. animal bedding.)

The scrap newspapers (10—10) of tabloid format are deposited upon the surface of an endless feed belt (12) of an input conveyor (15). A drive motor (16) is arranged to move the belt (12) in the direction indicated by an associated directional arrow. The newspapers (10—10), as shown, have been placed on the conveyor with their widthwise edges (W—W) parallel to the direction of advance of the moving feed belt (12) and, consequently the paper folds (F—F) are positioned transversely, at right angles, to the direction of advance. At the right hand end of conveyor (15) the scrap newspapers are discharged from the feed belt and fed into the nip between cooperating cutters (18—18) and (19—19) of the cutting assembly of a strip cutting machine (20).

The strip cutting machine (20) is arranged to perform a first stage cutting operation in which each of the newspapers (10—10) is cut into four strip sections ($s_1$, $s_2$, $s_3$, $s_4$) by spaced parallel cuts substantially perpendicular to the folded edge (F—F). The cutters (18—18) and (19—19) are mounted and keyed to vertically spaced, parallel, contrarotating shafts (22) (23), respectively. The shafts (22) and (23) are connected through a gear train (24) to be driven at equal speeds from a common drive motor (25).

The cutters (18—18) and (19—19) are in the form of cylindrical sleeves each having an axial length (L), and are mounted concentrically on their respective shafts (22) and (23). As illustrated in FIG.1 the cutters (18—18) on shaft (22) are spaced apart axially to achieve close interdigitation with the cutters (19—19) on the shaft (23) such that sharpened peripheral edges on adjacent end surfaces thereof cooperate to create three axially and uniformly spaced shear planes, or shear pairs, whereat paper stock fed between the contrarotating rolls is severed. Enhancement of the paper stock feed is effected by providing the cylindrical outer surfaces of the cutters (18—18) and (19—19) with closely spaced, parallel, vee-shaped, longitudinal grooves and by employing conventional comb fingers (not shown) to urge the paper stock against the corrugated outer surfaces. Additionally, the corrugated outer surfaces provide saw-tooth configurations to the cutting edges at the end faces of the cutters. The shear pair formed by the cooperating cutting edges of the centermost of the cutters (18—18) and (19—19) lies precisely at the center of an axially extending cutting feed zone, which has a total length of four times the axial length (L).

As previously stated, the strip cutting machine (20) is designed to cut each of the newspapers (10—10) into four strip sections ($s_1$, $s_2$, $s_3$, $s_4$). Accordingly by making the axial length (L) equal to one-quarter of the fourteen inch lengthwise dimension (F) of a newspaper (10—10) (i.e. L = three and one-half inches) and advancing the newspapers with the midpoint of each of the edges (F—F) registered precisely with the center of the cutter feed zone, each of the four strip sections will be cut to the same dimension of three and one-half inches. The desired precision centering can be accomplished, for example, by properly positioning and orienting the newspapers (10—10) as each newspaper is deposited onto the conveyor (15) or by providing the cutting machine (20) with an input guide chute (not shown) having converging wall sections for urging any misaligned newspapers into central registration and parallel wall sections for maintaining the requisite perpendicularity of edges (F—F) in respect to the direction of advance.

The four strip sections ($s_1$, $s_2$, $s_3$, $s_4$,) emerge from between the cooperating pairs of cutters (18—18) and (19—19) in a mutually parallel relationship and are deposited onto the upper surface of a continuously moving, endless feedbelt (29) of a declined output conveyor (30). It should be noted that the discharge end of the belt (29) is below the level of the end which receives the strip sections from the cutting machine (20), the upper surface of the belt declining at an angle of approximately 35°.

It should be noted that the output conveyor is connected, through a gear train (not shown), to the drive rooter (25) such that the linear speed of the feed belt (29) matches that of the feed belt (12) and the linear speed of the feed of the newspapers through the cutters. The strip sections ($s_1$, $s_2$, $s_3$, $s_4$) are deposited on the belt (29) as a coplanar, parallel array having the same spacial relationship and orientation that existed in the uncut newspapers. The lower discharge end of the output conveyor (30) is positioned above and spaced vertically approximately twelve inches from the upper surface of an intermittently operated feed belt (39) of a metering conveyor (40). At the discharge end of the output conveyor (30), each array of parallel strip sections falls with an end-over-end flipping movement onto the upper surface of the feed belt (39).

The direction of advance of feed belt (39), when operative, is indicated by the associated directional arrow. Stepwise, intermittent advance of the feed belt (39) is effected by periodically energizing a drive motor (42) to advance the feed belt in timed relationship with tile discharge of the newspapers (10—10) processed by the strip cutting machine (20). It should be noted that during the interval that a sectioned newspaper flips from the discharge conveyor (30) and drops onto the upper surface of the feed belt (39), the latter is held stationary, so that the strip sections ($s_1$, $s_2$, $s_3$, $s_4$), albeit inverted, are maintained in essentially the same spacial relationship in respect to each other as existed before being cut by the strip cutting machine (20). As indicated, the advance of the feed belt (39) is parallel to the paper folds (F—F) and accordingly perpendicular to the cuts between the sections ($s_1$, $s_2$, $s_3$, $s_4$).

After receiving a deposited array of segments ($s_1$, $s_2$, $s_3$, $s_4$) the feed belt (39) is stepped ahead to advance successive ones of the individual arrays toward its discharge end, at which individual arrays of segments are transferred one at a time to a continuously-moving feed belt (49) of a feed conveyor (50). The feed belt (49) is driven continuously by a motor (52) and operates in synchronism with the metering conveyor (40) to receive each of the successive arrays without disturbing the spacial relationship of the segments ($s_1$, $s_2$, $s_3$, $s_4$). The feed belt (49) moves each deposited array in a direction parallel to the folded edge (F—F) and into a strip cutting machine (60) while maintaining the spacial relationship of the segments (s1, s2, s3, s4).

The strip cutting machine (60) is designed to perform a second stage cutting operation, and is structurally substantially identical to the strip cutting machine (20), except for the cutting assembly. The cutting assembly comprises interdigitated cutters (61—61) and (62—62), mounted and keyed to contra rotating drive shafts (64) and (65) driven by drive motor (67). The cutters (61—61) and (62—62) are of equal axial widths and substantially narrower than the cutters (18—18) and (19—19) of the cutting machine (20). Accordingly, the shear planes or shear pairs formed by the cooperating cutting edges of the interdigitated cutters (61—61) and (62—62) are more closely spaced axially across the cutter feed zone.

For this illustrative example each of the cutters (61—61) and (62—62) has an axial length of one half inch, the cutting assembly of the strip cutting machine (60) presents a cutter feed zone having a width of at least eleven inches. Converging walls of an input guide chute (not shown) can be employed to center the arrays to ensure the cutting of each of sections (s1, s2, s3, s4) into a total of twenty-two substantially equal parts formed by twenty-one equally spaced cuts extending parallel to the fold edge (F—F) of each newspaper (10—10). After this second stage cutting operation the discharged paper bits drop onto a continuously moving belt (72) of an output conveyor (75) which operates to fill each of a succession of plastic bags with a predetermined quantity of the product.

In the above described illustrative embodiment the strip cutting machines (20) and (60) employed in the first stage cutting and the second stage cutting operations, respectively, have cutting assemblies structurally similar to commercially available shredders manufactured by Allegheny Paper Shredders Corporation of Delmont, Pa. and described in their publication entitled "High Volume Conveyor-fed Shredders," copyrighted 1990. The published contents of the latter are incorporated herein by reference, in respect to general structural details of the cutting assemblies.

The embodiment, illustrated in FIG. I produces a shredded paper product comprised of a very high percentage (ninety-five percent) of uniformly dimensioned (three and one-half inch by one half inch) paper bits. All of the paper bits would be of equal size were it not for the fact that in the second cutting stage operation, each cut parallel to and immediately adjacent to the paper fold (F—F) results in folded bits. Each folded bit has a total width, if unfolded, of one inch. These exceptional bits comprise less than five percent of the total output and tend to remain in their folded condition.

It should be apparent that, if a shorter length paper bit is desired (e.g. a length within a length range of two to four inches) the latter can be obtained by employing in the first cutting stage, a cutting assembly having four equidistantly spaced shear pairs (i.e. spaced two and four-fifths inches apart across a fourteen inch cutter zone). This arrangement would facilitate the production of paper bits all having a length of two and four-fifths inches. Again ninety-five percent of the paper bits would be one-half inch in width, and slightly less than five percent would be folded bits with a potential unfolded width of one inch.

For tutorial reasons, the arrangement of FIG. 1 has been purposely simplified and described in the context of producing shredded paper product front scrap newspapers in tabloid form. The paper bits produced are nearly all uniform in shape and of a predetermined size. If newspapers of standard straight broadsheet format were substituted, because of the presence of a second folded edge, the output would comprise an increased number of folded bits (approximately twenty-five percent) which, if unfolded, would have a length of seven inches. However, by employing a first stage cutting operation in which, for example, four equidistantly spaced (two and two-fifths inches apart) shear pairs were employed, four-fifths (eighty percent) of the paper bits in the final product would be two and two-fifths inches in length and none of the bits, even when unfolded, would not exceed four and four-fifths inches.

Generally, in the commercial production of satisfactory paper bedding product, there is usually no compelling requirement for achieving the extraordinary dimensional precision achieved in the above described examples. Instead, what is important is that the process and apparatus employed ensure the production of paper bits, the dimensions of a majority of which fall within predetermined optimum ranges found to be satisfactory for the various end uses of the product. More specifically, what is important is that only a negligible amount of the bits exceed a predetermined maximum width, that substantially none be less than a predetermined minimum length or a predetermined minimum width, and that a large majority should be substantially equal to a predetermined optimum length and a predetermined optimum width.

Heretofore, shredded strip lengths generally have been dependent on the original dimensions and format of the scrap newspaper stock. For example, conventional shredding of a tabloid format newspaper produced strips either fourteen inches long or twenty-two inches long depending on whether the newspaper was shredded lengthwise or widthwise. Because of the double folds, newspapers in standard straight broadsheet format produced strip lengths of twenty-two inches or twenty-eight inches. It has been found that strip lengths, ranging from fourteen to twenty-eight inches, grossly exceed the range of lengths suitable for animal bedding, particularly large animal bedding for the reasons earlier discussed. In the course of experimentation and studies relating to tile development of the invention, length ranges of optimally acceptable lengths and width ranges of optimally acceptable widths have been developed empirically.

It has been determined that a length range from two to eight inches and a width range from one quarter to one half inch are optimally acceptable ranges for bits suitable for general animal and agriculture purposes, stressing zero chaff and dust particle generation among the primary objectives. A particularly desirable choice for large animal bedding is an aggregate of paper bedding material comprising bits of approximately two to four inch strip lengths and one-half inch widths to meet most fully with the peculiar demands of similarity to traditional animal bedding materials and functional acceptability for traditional management practices. These results are summarized in the table below:

| TABLE OF RECOMMENDED BIT DIMENSIONS | | |
| --- | --- | --- |
| Required Type | Length | Width |
| Large Animal Bedding | 2"–4" | ½" |
| Poultry and Small Animal Bedding | 2" | ¼" |

-continued

TABLE OF RECOMMENDED BIT DIMENSIONS

| Required Type | Length | Width |
| --- | --- | --- |
| Agricultural Bedding (Mulch) | 2"–8" | 1/8"–1/4" |

There are commercially available paper shredders which, modified and employed in accordance with the teachings of this invention, can serve as functional equivalents of the first and second stage cutting machines (20) and (60), respectively of FIG. 1. For example, Allegheny Paper Shredders of Delmont, Pa. offers conveyor-fed shredders, designated Allegheny Model 16-Series; 18-Series and 20-Series having cutter feed widths of sixteen inches, eighteen inches and twenty inches, respectively. These commercial shredders are available with the capability to cut paper strips to widths of from five-sixteenth inch and up. Such a shredder with uniformly spaced one-half inch cutters could function as the second stage cutting machine (60) of FIG. 1, provided that, in accordance with the teachings of this invention, appropriate modifications insured the requisite orientation and lateral alignment of strip arrays with respect to the axially spaced shear pairs as each eleven inch wide array moves into the cutter feed zone (which in the case of one of these commercial shredders would be sixteen or more inches wide depending on the model.)

Because of the specified three and one-half inches axial spacing between shear pairs, a functional equivalent of the first stage cutting machine (20) would require customization of the cutter assembly of any of the above commercial examples, at least to the extent of providing the specified, relatively large shear pair spacings. Again, however, for full functional equivalency, the commercial machine would require provisions to insure precision lateral positioning of the paper stock with respect to the spaced shear pairs of the cutter assembly.

It should be understood, that with the acceptance of reasonably wider tolerances in respect to out-of-range bits, modifications required for commercially available shredders may be reduced by eliminating the need for precision centering of the paper stock. For example, one of the aforementioned commercial shredders, having a sixteen inch wide cutter feed zone, provided with three shear pairs spaced equidistantly (i.e. four inches apart) across the entire lateral extent of the cutter feed zone can be expected to ensure the production of one hundred percent of output bits within the optimum length range of two to eight inches when processing tabloid newspaper stock. From FIG. 2A which illustrates diagrammatically one of the two off-center positioned extremes, right and left, of a tabloid newspaper, with one of its fourteen inch edges perpendicular to the direction of advance into the first stage cutter feed zone opening having a total width of sixteen inches. It can be demonstrated that wherever the location of the center of the advancing folded edge may lie between the off-center extremes, the minimum bit length will be two inches and the maximum bit length four inches.

Broadsheet format newspaper stock presents a complication in the uniformity of optimum range effluent from a shredder arranged such as the one illustrated in FIG. 2A. Due to the additional fold inherent in newspaper stock of broadsheet format, if a folded section were cut to two or four inches as heretofore described according to FIG. 2a, the resulting bit lengths, if unfolded, would be four and eight inches respectively. Although these dimensions fall within the general optimum range, if the end use requirements dictate a specific shorter length optimum sub-range (e.g. large animal bedding with a length range of two to four inches), achievement of one hundred percent of the optimum subranges requires that the number and placement of shear pairs and consistency of newspaper stock feed need appropriate adjustment.

If large animal bedding (see: Table of Recommended Dimensions) were desired the production of bits of dimensions falling one hundred percent within the optimum range of two to four inches requires an additional cutter shear pair placed at either the right or left side of the sixteen inch cutter feed zone and spaced two inches from that end of the feed zone. An example of such positioning is shown illustrated in the diagram of FIG. 2B. In the FIG. 2B configuration, a tabloid style newspaper would continue to be fed with the fourteen inch folded edge perpendicular to the direction of advance into the cutter feed zone. However, broadsheet newspaper stock would be consistently fed with its fourteen inch once-folded edge parallel to the cutter feed zone and perpendicular to the direction of advance. In addition the eleven inch twice-folded edge would be positioned at the extreme left position, i.e., adjacent to where the additional shear pair of cutters is mounted to ensure that the parallel cut made adjacent to this edge is spaced precisely two inches from the fold. This conformity would eliminate production of double size strips exceeding the optimum range maximum from occurring because of the additional folded edge of broadsheet style newspapers.

It will be understood that the forgoing descriptions of methods and apparatus are merely exemplary embodiments of the invention. Various modifications and other embodiments may be made within the spirit and scope of the invention.

Although the described exemplary embodiment employs a specific type of cutting means, it is manifest that other types can be used in either or both cutting stages. Examples of possible alternatives include the use of laser beam cutting, or hot wire slicing, preferably within an inert or other protective atmosphere, circular thin disc blade cutters, reciprocating shears, and scissor type shear blades.

As an alternative to relying on the inherent flipping movement imparted during discharge from the output conveyor (30), an intermediate conveyor mounted on a turntable can be positioned between the discharge end of the output conveyor (30) and the input end of another continuously moving belt conveyor which would replace the conveyor (40) and dispense with the need for the stepped intermittent movement of the receiving conveyor. The turntable-mounted conveyor would be controlled in timed relationship with the periodic discharge of the strip arrays from the output conveyor (30) to receive a discharged array, rotate a quarter turn clockwise (ninety degrees) to place the discharge end of the intermediate conveyor in alignment with the input end of a continuously moving input conveyor of the second stage cutting machine.

It can be seen from the foregoing description that, through development of a new and improved shredder style processing technology, which inherently reduces the proliferation of dust particles, it is now possible to efficiently and reliably produce disciplined sizes of final product to conform optimally to various requisite uses.

I claim:

1. A method of converting scrap newspapers, assembled in either a standard broadsheet format having a fourteen inch once folded edge and a twice folded edge or a standard tabloid format having a fourteen inch once folded edge, each format also having an eleven inch edge, into discrete paper bits for recycled use as bedding material, which method comprises:

successively advancing individual newspapers along a predetermined planar path in a direction perpendicular to the fourteen inch, once folded edges of the newspapers, said planar path including a linear reference boundary parallel to the direction of advance;

moving each of the advancing newspapers with the eleven inch edges thereof parallel to the direction of advance with a selected one of the eleven inch edges in registration with said linear reference boundary, said selected one of the edges, only in respect to a newspaper of broadsheet format being limited to the twice folded edge thereof;

severing each of the successively advancing newspapers into a plurality of parallel strips by making three parallel cuts perpendicular to the once folded edge and spaced uniformly four inches apart, the cut nearest to the linear reference boundary being spaced four inches therefrom, whereby the entire length of the fourteen inch, once folded edges is divided into three segments of four inches and a remaining end segment of two inches located at the end furthest from said linear reference boundary, and simultaneously making an additional cut parallel to all of said other cuts and midway between said linear reference boundary and the immediately adjacent one of said other cuts, the additional cut in conjunction with the other of said cuts ensuring that the unfolded dimensions of the parallel strips by twice folded edges do not exceed four inches, and maintaining the strips in a parallel array while forming a multiplicity of rectangular bits by making a plurality of uniformly spaced apart and simultaneous cuts extending parallel to the once folded edges of the newspapers and perpendicular to the parallel edges of the strips, the uniform spacing of the last mentioned cuts being no greater than about one half inch and no less than about one quarter inch, whereby essentially the total production of rectangular bits falls within a range of two to four inches in length and one quarter to one half inch in width.

2. In a method of converting scrap newspaper of standard broadsheet format having a single folded edge and a double folded edge into discrete paper bits for recycled use as bedding material, a first stage severing step of dividing an assembled broadsheet format newspaper into a plurality of parallel strips by making simultaneously a predetermined number of mutually parallel and spaced cuts extending parallel to and spaced from the double folded edge of the newspaper with countrarotating rollers, and a second stage severing step of dividing said parallel strips into a multiplicity of rectangular paper bits by making simultaneously a plurality of uniformly spaced apart cuts extending parallel to the single folded edge of the newspaper and perpendicular to the cuts made in said first stage severing step via a pair of interdigitated cutters, the improvement comprising wherein said predetermined number of cuts made in the first stage severing step extend across the entire length of the single folded edge to form a plurality of segments, all but one of said segments having the same lengthwise dimension, the remaining segment being located furthest from the double folded edge and having no greater than the same lengthwise dimension or no less than one half the lengthwise dimension, and further comprising making an additional cut simultaneously with the other cuts made during the first stage severing step, said additional cut being located parallel to the double folded edge and substantially midway between the single folded edge and the one of said predetermined number of cuts, which is located nearest to said double folded edge, said additional cut in conjunction with the other cuts made during the first stage severing step resulting in the production of a maximum number of paper bits having a uniform maximum length equal to said lengthwise dimension and no bits with lengths exceeding the maximum length or less than one half of the maximum length.

3. The method of claim 2, wherein the spacing of the uniformly spaced apart cuts made in the second stage severing step is no greater than one half said lengthwise dimension.

4. The method of claim 2, wherein said lengthwise dimension is four inches.

5. The method of claim 4, wherein the spacing of the uniformly spaced apart cuts made in the second stage severing step is approximately one half inch.

6. The method of claim 4, wherein the spacing of the uniformly spaced apart cuts made in the second stage severing step is no greater than approximately one half inch and no less than approximately one quarter inch.

7. An apparatus for shredding newspapers, assembled uniformly in a standard, twice folded, broadsheet format, into discrete rectangular bits, of predetermined dimensions, said apparatus comprising a first stage cutting machine having a pair of spaced, parallel countrarotating shafts with cutting members mounted thereon at uniformly spaced intervals and interleaved to provide a plurality of uniformly spaced shear pairs located respectively in mutually parallel, vertical shear planes, each of said shear planes positioned perpendicular to the rotational axes of the shafts and spaced uniformly apart from adjacent one of the other shear planes within a horizontally extending cutter feed zone opening of a predetermined width position across and in alignment with nip between the interleaved cutter members, said cutter members operable upon contrarotation of the shafts to effect uniformly spaced, parallel cuts through a newspaper advancing transversely through the feed zone opening to the nip, an auxiliary cutting means mounted on and operable in synchronism with the shafts of the first cutting stage for producing an additional cut through the advancing newspaper, said additional cutter lying in an auxiliary shear plane parallel to the other shear planes and spaced horizontally form and midway between the immediately adjacent one of the other shear planes and said one end of the cutter feed zone opening, means for advancing and feeding an assembled newspaper through the cutter feed zone opening in a direction of advance perpendicular to said rotational axes and parallel to one of the folded edges of the newspaper to cut the latter into an array of mutually parallel strips, and a second stage cutting machine having means for making a multiplicity of uniformly spaced cuts across said array and parallel to the other of the folded edges of the newspaper, wherein the cutting members are mounted and positioned on the shafts so that the shear pair nearest to one end of the cutter feed zone opening is located in a shear plane vertically intersecting said opening and spaced horizontally from said one end thereof from a linear boundary a distance equal to the uniform spacing between said shear planes, the advancing and feeding means is positioned and operable to advance and feed the newspaper with said one of the folded edges thereof in registry with said one end of the cutter feed zone opening.

8. The apparatus according to claim 7 wherein the shear plane associated with the auxiliary cutting means is located two inches from said one end of the cutter feed zone opening.

9. The apparatus according to claim 8 wherein the predetermined width of the cutter feed zone opening is at least sixteen inches.

10. The apparatus according to claim 9 wherein the predetermined width of the feed zone opening is at least sixteen inches and, in addition to the auxiliary shear plane provided by the auxiliary cutting means, there are three of said uniformly spaced shear planes, spaced four inches apart horizontally across the feed zone opening.

* * * * *